(12) United States Patent
Kitamura et al.

(10) Patent No.: US 6,975,080 B2
(45) Date of Patent: Dec. 13, 2005

(54) ROTATING ELECTRICAL MACHINE FOR VEHICLE

(75) Inventors: Yutaka Kitamura, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/036,372

(22) Filed: Jan. 18, 2005

(65) Prior Publication Data
US 2005/0156543 A1 Jul. 21, 2005

(30) Foreign Application Priority Data
Jan. 19, 2004 (JP) .............................. 2004-010884

(51) Int. Cl.[7] .............................................. H02P 1/04
(52) U.S. Cl. ...................... 318/109; 318/139; 318/144; 320/148; 320/149
(58) Field of Search ................. 318/109, 139, 318/144; 320/148, 149

(56) References Cited

U.S. PATENT DOCUMENTS

| | | | |
|---|---|---|---|
| 3,617,857 A * | 11/1971 | Gunderson | 322/28 |
| 4,128,800 A * | 12/1978 | Scott et al. | 322/28 |
| 4,354,127 A * | 10/1982 | Stroud | 310/198 |
| 4,701,692 A * | 10/1987 | Takeuchi et al. | 322/90 |
| 5,091,679 A * | 2/1992 | Murty et al. | 318/153 |
| 5,557,181 A * | 9/1996 | Naito et al. | 318/376 |
| 5,742,498 A * | 4/1998 | Taniguchi et al. | 363/145 |
| 6,075,331 A * | 6/2000 | Ando et al. | 318/376 |
| 6,114,775 A * | 9/2000 | Chung et al. | 307/10.1 |
| 6,175,217 B1 * | 1/2001 | Da Ponte et al. | 322/19 |
| 6,281,613 B1 * | 8/2001 | Nakamura et al. | 310/181 |
| 6,384,551 B1 * | 5/2002 | Watanabe | 318/139 |
| 6,414,453 B1 * | 7/2002 | Tamagawa et al. | 318/139 |

FOREIGN PATENT DOCUMENTS

JP 2674556 B2 7/1997

* cited by examiner

*Primary Examiner*—Rita Leykin
(74) *Attorney, Agent, or Firm*—Sughrue Mion, PLLC

(57) ABSTRACT

A rotating electrical machine for a vehicle is capable of improving the acceleration performance and the fuel mileage of the vehicle while achieving the prevention of occurrence of overvoltage and the improvement of its power generation characteristic at the same time. The machine includes an armature having an armature core and an armature winding wound around the armature core for generating an output voltage to charge a battery; a rotor having a rotor core with a field winding wound therearound, and permanent magnets for supplying magnetic flux to the armature core; and a voltage control section that adjust the output voltage of the armature by controlling the field current based on the value of an output voltage of the armature winding and the value and the direction of flow of the field current flowing through the field winding.

17 Claims, 10 Drawing Sheets

ROTATING ELECTRICAL MACHINE FOR VEHICLE

BACKGROUND OF THE INVENTION

1. Field of the Invention

The present invention relates to a rotating electrical machine for a vehicle having a rotor with a permanent magnet for supplying magnetic flux to an armature core.

2. Description of the Related Art

In known vehicular alternators using a permanent magnet as a field magnet, there has been a technique that is capable of reducing the amount of electric power generation during the high speed rotation of an alternator so as to prevent the destruction thereof due to overvoltage to a battery or an electrical load. In such a technique, a permanent magnet magnetized in a direction to reduce leakage flux is interposed between the magnetic poles of a claw pole rotor, and the specification of this permanent magnet is adjusted in such a manner that the output of the alternator at a maximum rotational speed thereof when the field current of a field winding is made zero becomes a magnetic excitation force that is substantially equal to and does not exceed the demand value of the normal load of a vehicle (see, for example, a first patent document: Japanese patent No. 2674556 (pages 2 and 3, FIGS. 1 through 4)).

According to the vehicular alternator referred to above, however, there arises the following problem. That is, when the field current is made zero after excitation due to the field current is performed, the remanence remains in a field core, and In this case, even if the excitation force due to the permanent magnet is adjusted, the output of the alternator during the high speed rotation thereof is caused to increase under the action of the remanence, so the battery is brought into a state of overvoltage.

SUMMARY OF THE INVENTION

The present invention is intended to obviate the problem as referred to above, and has for its object to provide a rotating electrical machine for a vehicle which is capable of improving the acceleration performance and the fuel mileage of the vehicle while achieving the prevention of occurrence of overvoltage and the improvement of its power generation characteristic at the same time.

In order to achieve the above object, according to the present invention, there is provided a rotating electrical machine for a vehicle including an armature having an armature core and an armature winding wound around the armature core for generating an output voltage to charge a battery; a rotor having a rotor core with a field winding wound therearound, and permanent magnets for supplying magnetic flux to the armature core; and a voltage control section that adjust the output voltage of the armature by controlling the field current based on the value of an output voltage of the armature winding and the value and the direction of flow of the field current flowing through the field winding. When the rotor rotates, the voltage control section inhibits an output current from being output from the armature winding to the battery by controlling the output voltage of the armature winding to one of a plurality of control voltages that are set equal to or lower than an overvoltage of the battery.

With the rotating electrical machine for a vehicle according to the present invention, there can be obtained an advantageous effect that the overvoltage prevention and the power generation characteristic improvement can be compatible with each other, and at the same time the acceleration performance and the fuel mileage of the vehicle can also be improved.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. Throughout the following embodiments and illustrated figures of the present invention, the same or corresponding members or parts are identified by the same symbols.

Embodiment 1.

Figure 1:
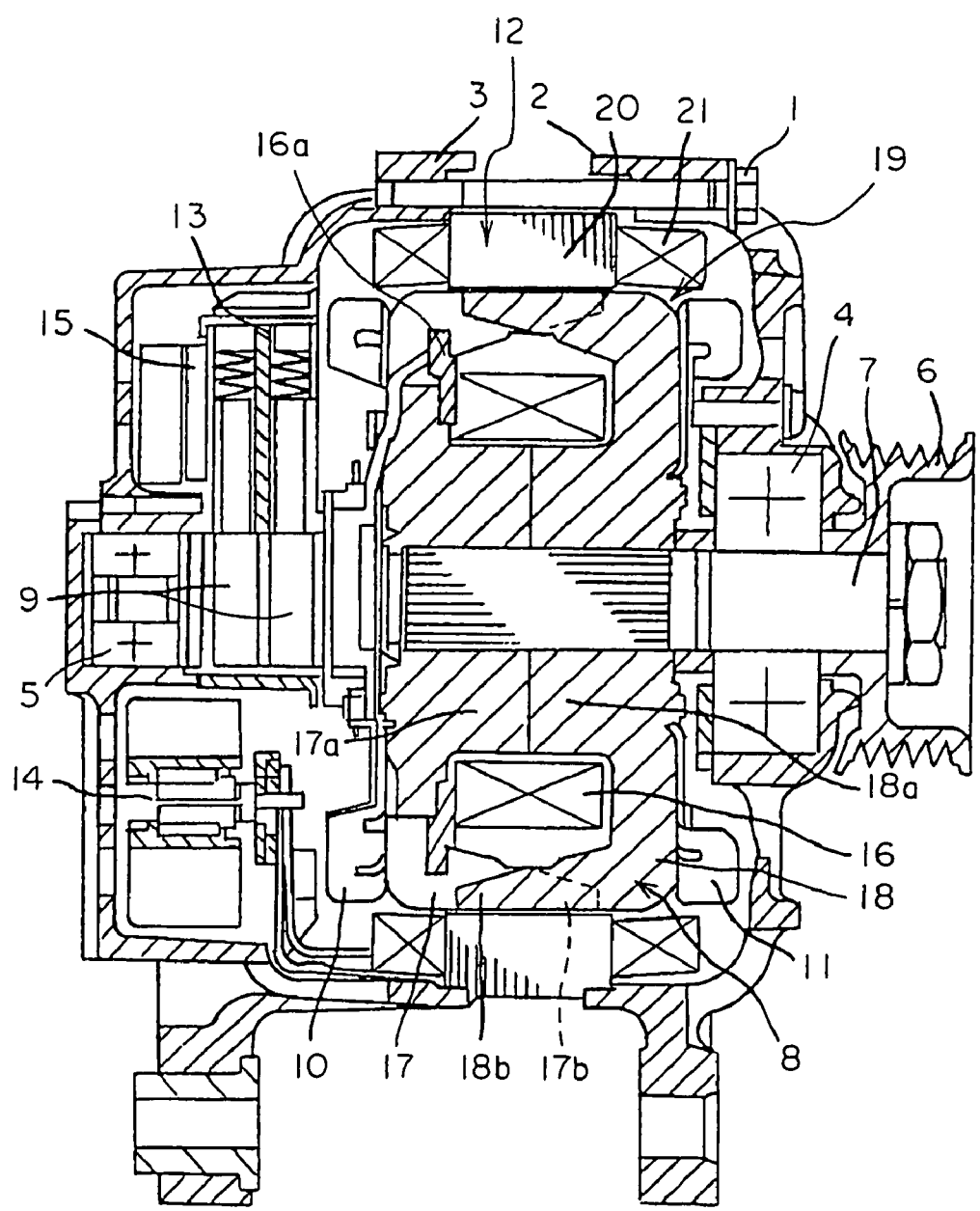
FIG. 1 is a cross sectional view showing the construction of a charging generator according to a first embodiment of the present invention.
Figure 2:
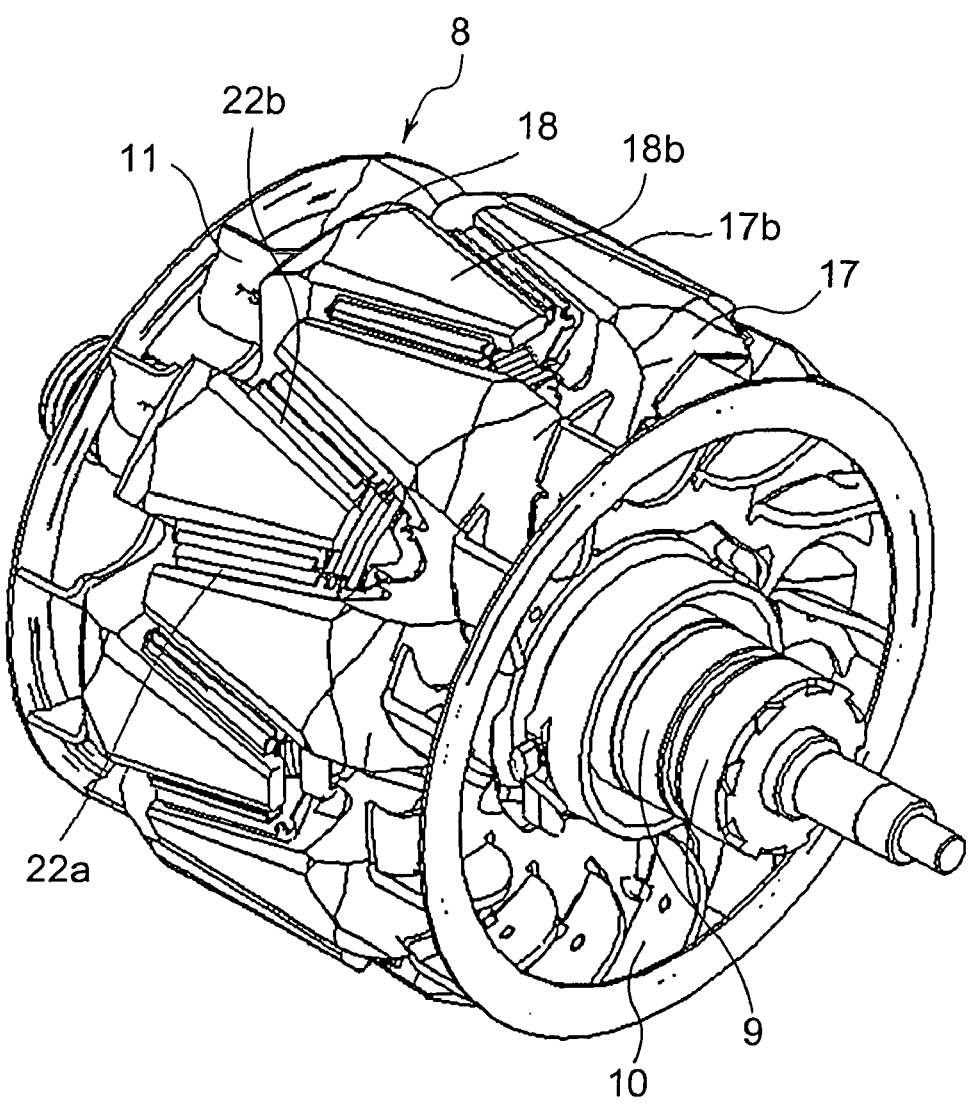
FIG. 2 is a perspective view showing the detailed structure of a rotor part of the charging generator of FIG. 1.

A first embodiment of the present invention will be described below based on the accompanying drawings. FIG. 1 is a cross sectional view that shows the construction of a charging generator according to a first embodiment of the present invention, and FIG. 2 is a perspective view that shows the detailed structure of a rotor of FIG. 1.

As shown in FIG. 1, this charging generator, which is an example of a rotating electrical machine, includes a casing composed of a pair of brackets 2, 3 made into an integral unit by means of bolts 1 (though only one being illustrated), a rotation shaft 7 supported by the casing through a pair of bearings 4, 5 and having a pulley 6 fixedly attached to one end thereof, a rotor 8 of a claw pole type fixedly mounted on the rotation shaft 7, slip rings 9 fixedly secured to the other end of the rotation shaft 7 for supplying current to the rotor 8, a pair of air cooling fans 10, 11 fixedly attached to the opposite side surfaces of the rotor 8, an armature 12 fixedly secured to the brackets 2, 3, a brush holder 13 that receives a pair of brushes slidable on and along the slip rings 9, a commutating device 14 electrically connected with the armature 12 for commutating the output current of the armature 12, and a voltage control unit 15 fitted into the brush holder 13 for controlling the output voltage of the armature 12.

The rotor 8 is provided with a field winding 16 through which electric current passes to generate magnetic flux, and a rotor core 19 formed of a pair of pole core bodies 17, 18 arranged so as to enclose the field winding 16 with magnetic poles being formed therein by the magnetic flux.

The rotor core 19 has cylindrical portions 17a, 18a with the field winding 16 arranged thereon through a bobbin 16a, and hook-shaped magnetic pole portions 17b, 18b.

The magnetic pole portions 17b, 18b are provided so as to form a predetermined number of magnetic poles, respectively, and they alternately cross one another so as to cover the outside diameter side of the field winding 16. The magnetic pole portions 17b, 18b are alternately arranged in a circumferential direction at a prescribed pitch through a predetermined interval or distance formed between adjacent ones thereof, so that they are magnetized to alternately become different or opposite poles from one another by the field winding 16. Permanent magnets 22a, 22b are interposed in the intervals or distances between adjacent ones of the magnetic pole portions 17b, 18b so as to reduce leakage flux therebetween.

The armature 12 is composed of an armature core 20 through which a rotating field generated by the rotor 8 passes, and an armature winding 21 having three winding portions which are each formed of a conductor wound around a corresponding core portion of the armature core 20 and through which an output current flows.

Figure 3:
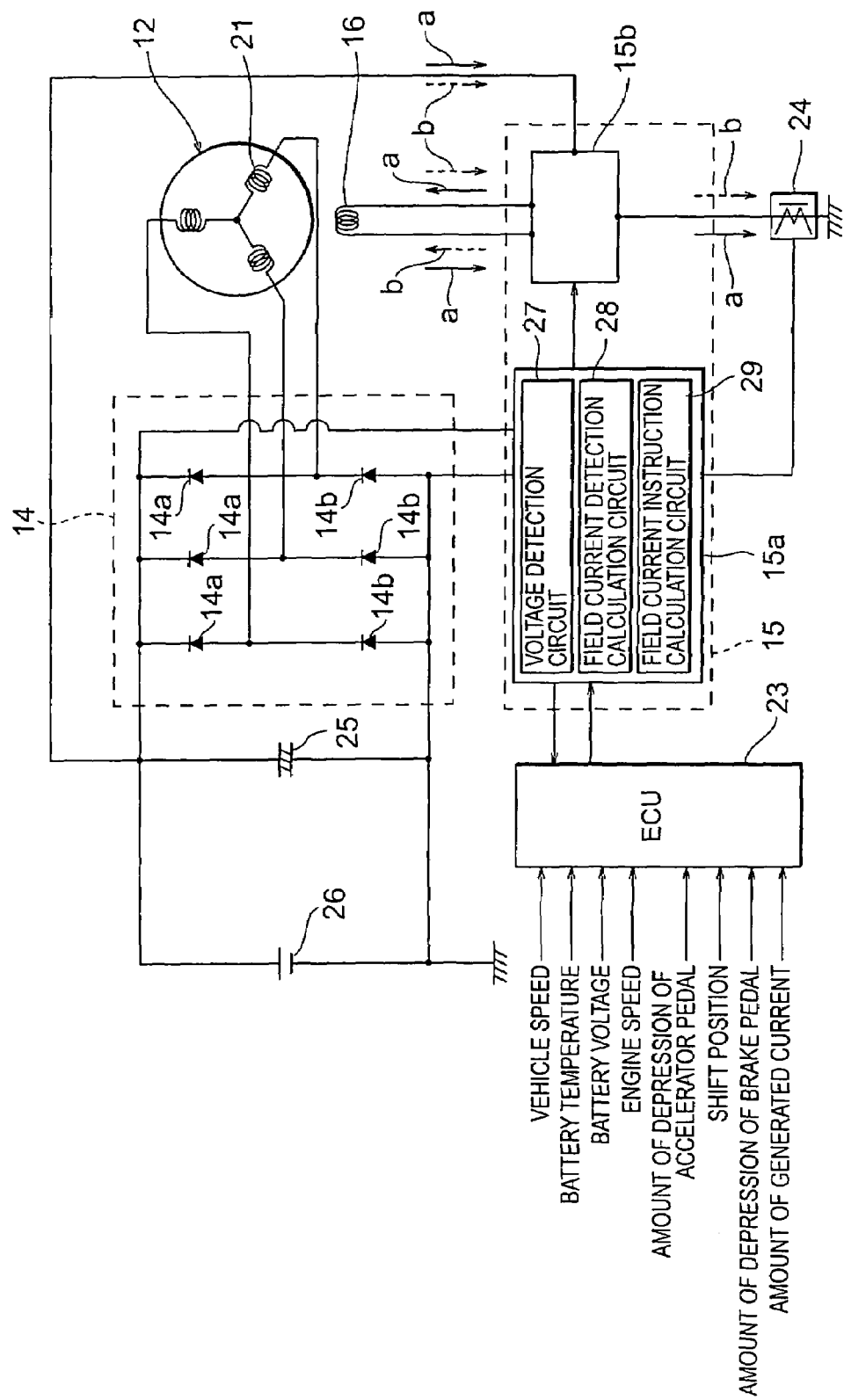
FIG. 3 is a circuit diagram showing a battery recharging system including the essential portions of the charging generator of FIG. 1.

FIG. 3 is a circuit diagram that shows a battery recharging system including the essential portions of the charging generator illustrated in FIGS. 1 and 2.

As shown in FIG. 3, the battery recharging system includes a voltage control section in the form of a voltage control unit 15 for controlling an output voltage of the armature winding 21, an ECU (Engine Control Unit) 23 that inputs necessary information to the voltage control unit 15, a field current detector 24 that outputs a voltage signal of a voltage corresponding to the value of the field current output from the field current control circuit 15b, a commutating device 14 for commutating an output current of the armature winding 21, a capacitor 25 connected in parallel to the commutating device 14, and a battery 26 charged by the voltage supplied through the commutating device 14.

In FIG. 3, arrow a indicates the direction in which a field current of a positive direction (the direction of excitation) flows and arrow b indicates the direction in which a field current of a negative direction (the direction of reverse-excitation) flows.

The voltage control unit 15 is provided with a field current control calculation instruction part 15a and a field current control section in the form of a field current control circuit 15b that receives a command or instruction from the field current control calculation instruction part 15a thereby to control the magnitude and the direction of flow of the field current.

The field current control calculation instruction part 15a includes a voltage detection section in the form of a voltage detection circuit 27 for detecting the output voltage of the armature winding 21, a field current detection section in the form of a field current detection calculation circuit 28 for detecting the value and direction of the field current flowing through the field winding 16 based on the output of the field current detector 24, and a field current instruction calculation part in the form of a field current instruction calculation circuit 29 for calculating the value and direction of the field current to be supplied to the field winding 16 based on the value and direction of the field current detected by the field current detection calculation circuit 28 and the output voltage detected by the voltage detection circuit 27.

The field current control calculation instruction part 15a receives through the ECU (Engine Control Unit) 23 a signal that has been processed in accordance with the temperature of the battery, the voltage of the battery, the speed of the vehicle, the rotational speed of an engine installed on the vehicle, the amount of depression of an accelerator pedal, the shift position of a transmission, the amount of depression of a brake pedal, and the amount of generated current. The field current control calculation instruction part 15a corrects the control voltage of the commutating device 14 based on the temperature of the battery so that the control voltage becomes within a range where the battery is not overdischarged or overcharged.

In addition, the field current control calculation instruction part 15a detects the start of acceleration of the vehicle based on at least one of the amount, speed and acceleration of depression of the accelerator pedal.

The commutating device 14 is constructed by arranging three pairs of serially coupled diodes 14a, 14b in parallel to one another. The winding portions of the armature winding 21 have their one ends connected with one another to form a Y connection (star connection), and their other ends connected to corresponding midpoints of the three pairs of serially coupled diodes 14a, 14b through ac wiring, respectively. The battery 26 and the capacitor 25 are connected in parallel to the commutating device 14, so that the output current of the armature winding 21 commutated by the commutating device 14 is supplied to the battery 26. That is, when the output voltage of the armature winding 21 is lower than the voltage Vb of the battery 26, the output current commutated by the commutating device 14 does not flow from the armature winding 21 to the capacitor 25 and the battery 26.

Next, the operation of the charging generator as constructed above will be described below.

When the rotor 8 is driven to rotate at a predetermined rotational speed, the output voltage of the armature winding 21 immediately after the field current has been returned from the maximum value to zero becomes higher than the control voltage for the battery 26 during normal operation or during regeneration, due to the magnetizing forces of the permanent magnets 22a, 22b with respect to the armature core 20. Here, if the field current 16 remains in the state of zero, an overvoltage state of the output voltage continues, as already stated.

Accordingly, in the charging generator according to the first embodiment of the present invention, the direction of flow of the field current is controlled to be switched in the opposite direction so as to reduce the field magnetomotive force of the generator. For such control, a plurality of control voltages are provided so that the output voltage can be controlled to an optimal control voltage in accordance with the purpose of the control.

Here, note that even if the output voltage exceeds a predetermined control voltage in spite of the field current being controlled to decrease to zero from the normal supply direction as stated above, the voltage control unit 15 controls the output voltage to a control voltage by reversely exciting the field winding 16 through supplying a reverse-excitation current to the field winding 16. This reverse-excitation current is set based on the output voltage and the rotational speed of the rotor 8 immediately after the field magnetomotive force due to the field current has been returned from a maximum field magnetomotive force to zero in accordance with the combination of the magnetizing forces of the armature winding 21, the field winding 16 and the permanent magnets 22a, 22b.

Hereinafter, the above-mentioned mechanism will be described in FIGS. 4 through 6 while making a comparison between the output voltage characteristics of charging generators of the first embodiment and the prior art, and the detailed control operation of the charging generator of the first embodiment will be described in FIG. 7.

Figure 4:
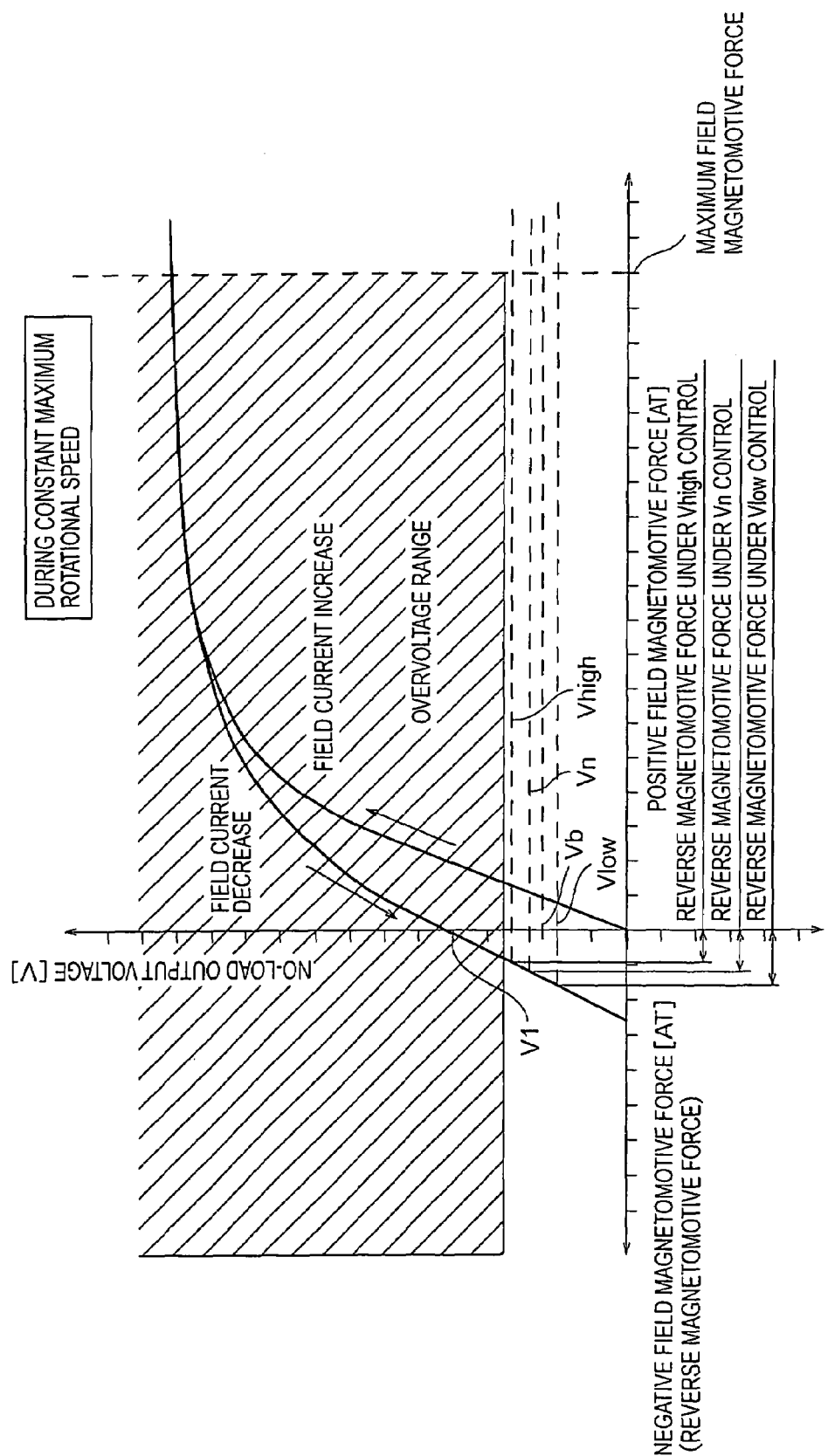
FIG. 4 is a characteristic view showing the relation between a field magnetomotive force and a no-load output voltage of the charging generator according to the first embodiment of the present invention.

FIG. 4 is a characteristic view that shows the relation between the field magnetomotive force and the no-load output voltage of the charging generator according to the first embodiment of the present invention. FIG. 4 illustrates the no-load output voltage of the armature winding 21 when field current is decreased from the maximum field magnetomotive force to zero by supplying the field current to the field winding 16 from the state of no remanence or residual magnetism in the magnetic pole portions 17b, 18b at the predetermined rotational speed (a maximum speed here) of the rotor 8. Hysteresis develops in the output voltage of the armature winding 21 when the field magnetomotive force is below substantially a magnetic saturation range of the magnetic circuit.

That is, a voltage V1 is generated due to residual magnetic flux even if the field current is made zero, and with the charging generator having the permanent magnets 22a, 22b arranged between the magnetic poles, the magnetic flux due to the magnetizing forces of the permanent magnets 22a, 22b is added to the residual magnetic flux. Accordingly, when the rotor 8 is rotating at a speed more than the predetermined rotational speed, the output voltage of the armature winding 21 may exceed a control voltage Vn during normal operation (hereinafter referred to as normal control voltage Vn) and a control voltage Vhigh during regeneration operation (hereinafter referred to as regeneration control voltage), so that the battery 26 can be brought into an overvoltage state.

However, even in case of no load or light load as shown in FIG. 4, the magnetomotive force can be controlled to a relatively not so large reverse-excitation magnetomotive force (e.g., a reverse-excitation magnetomotive force during Vhigh control, a reverse-excitation magnetomotive force during Vn control, or a reverse-excitation magnetomotive force during Vlow control). That is, by causing the field current in the opposite direction, it is possible to control the output voltage of the armature winding 21 to an arbitrary control voltage (Vhigh, Vn, or Vlow) that is not an overvoltage.

Figure 5:
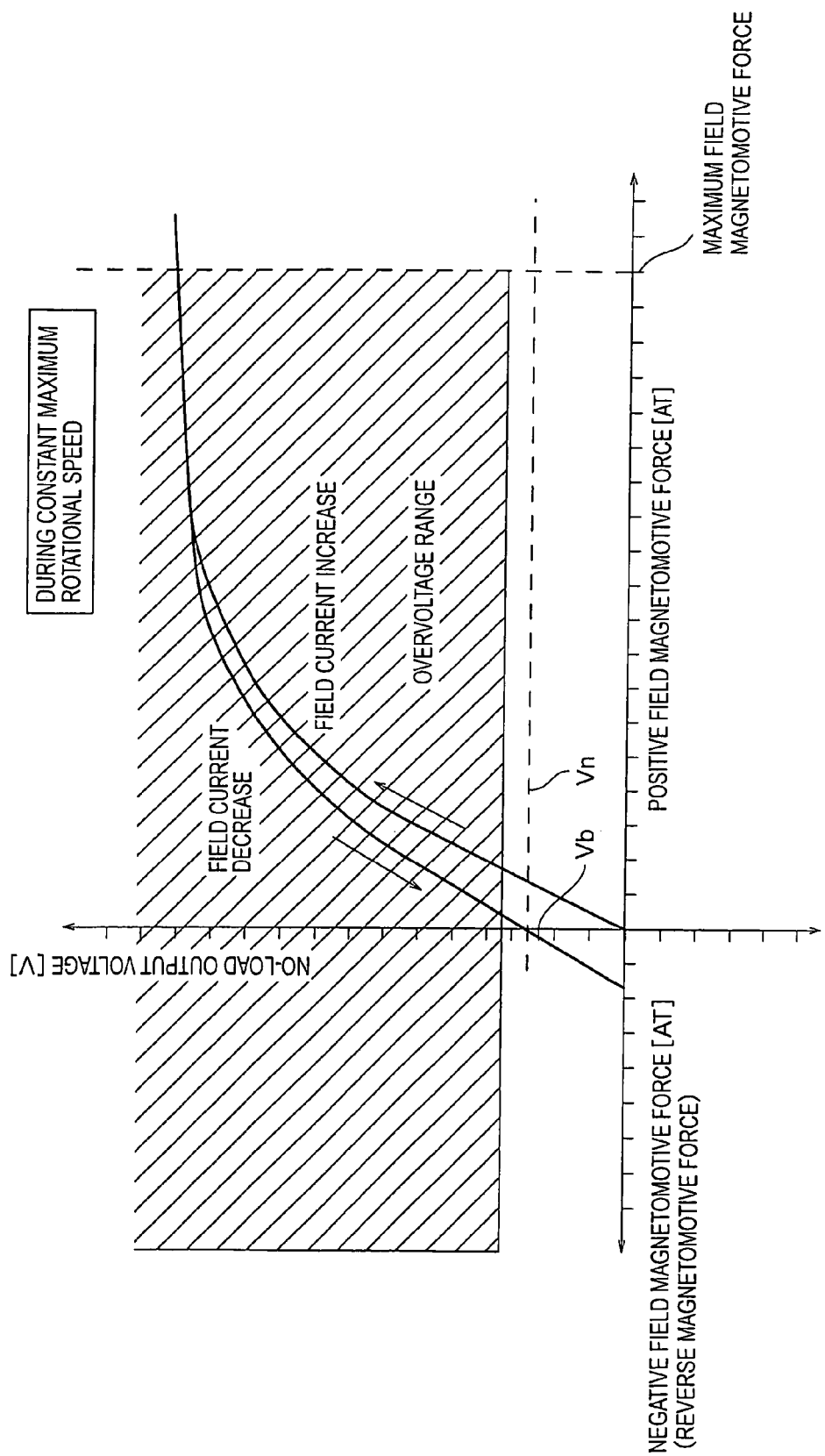
FIG. 5 is a characteristic view showing the relation between a field magnetomotive force and a no-load output voltage of a prior art charging generator with a permanent magnet.

Here, the relation between the field magnetomotive force and the no-load output voltage of a prior art charging generator with a permanent magnet is shown in FIG. 5 as an example for comparison with the charging generator according to the first embodiment of the present invention. In the prior art charging generator with a permanent magnet, when the charging generator is rotating at a predetermined rotational speed, as shown in FIG. 5, an output voltage of an armature winding immediately after a field current flowing through a field winding is returned from a maximum value to zero is set to a value below a normal control voltage Vn for a battery. Accordingly, it is found that there are limitations to the kind of the magnets, the magnitude of their magnetizing forces and the like, and hence the improvement of the power generation output characteristic of the generator is limited.

Figure 6:
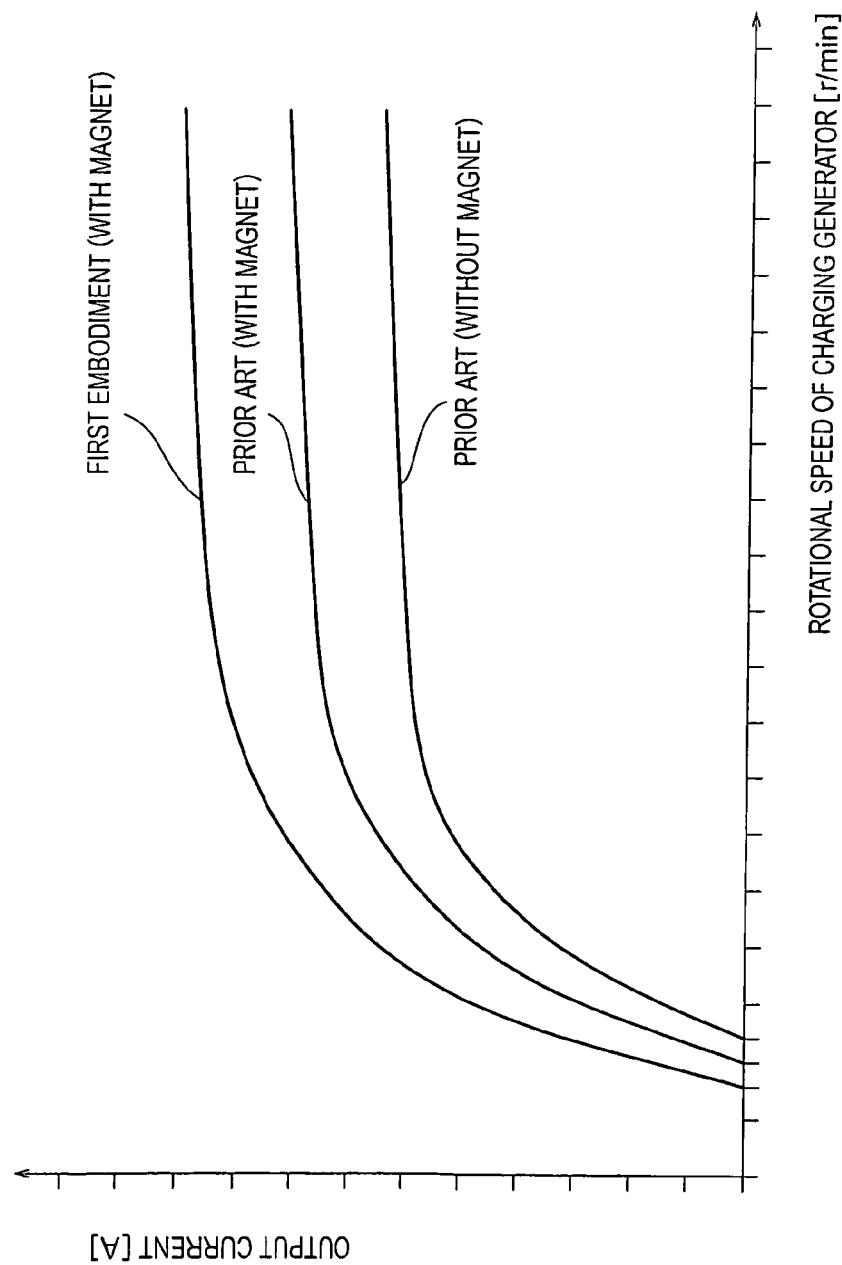
FIG. 6 is a characteristic view showing the power generation output characteristics of the charging generator of FIG. 1 and the prior art charging generator.
Figure 7:
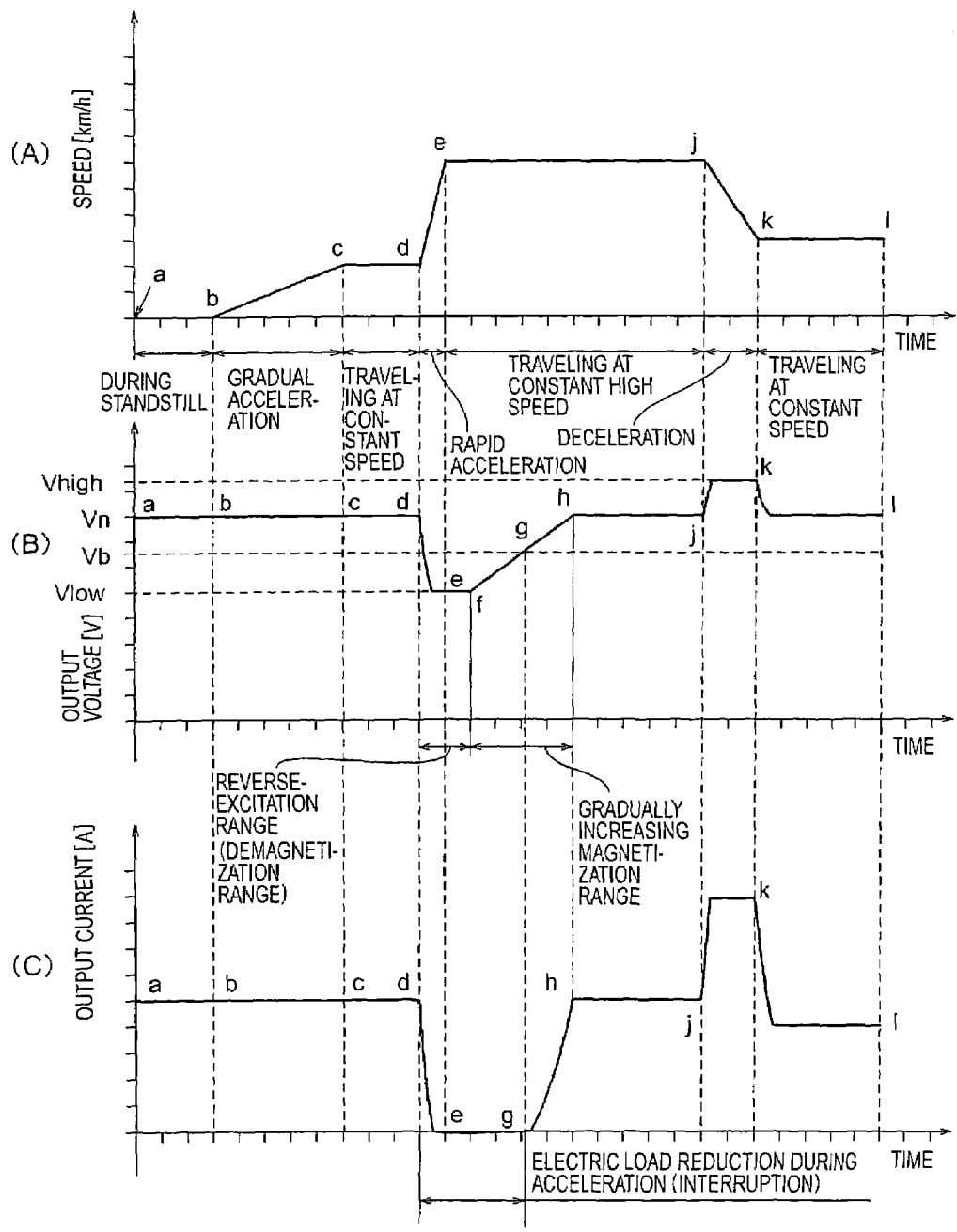
FIG. 7 is a view showing the relation between the speed of a vehicle, and the output voltage and the output current of the charging generator of FIG. 1.

Further, FIG. 6 is a characteristic view that shows the power generation output characteristic of the charging generator of the first embodiment of the present invention and that of the prior art charging generator.

The charging generator according to the first embodiment of the present invention can control the output voltage of the armature winding 21 to a desired control voltage so as to suppress the generation of overvoltage by supplying a reverse-excitation current to the field winding 16, as shown in FIG. 6. Therefore, it will be understood that it becomes possible to set the magnetizing forces of the permanent magnets 22a, 22b in this embodiment greater than those in the prior art, thus making it possible to generate the greatest power generation output.

In the charging generator according to the first embodiment of the present invention, as stated above, three control voltages are set, i.e., the normal control voltage Vn for normal charging of the battery 26, the load-interruption control voltage Vlow for reduction of the engine load, and the regeneration control voltage Vhigh for regenerative charging of the battery 26. In this case, the magnitudes of these control voltages are set to satisfy relations of Vhigh>Vn≧Vb>Vlow, and the output voltage of the armature winding 21 is controlled to the normal control voltage Vn during normal charging operation, to the load-interruption control voltage Vlow during interruption of the engine load, and to the regeneration control voltage Vhigh during deceleration of the vehicle.

FIGS. 7(A) through 7(C) are views that show the relation among the vehicle speed, the output voltage and the output current of the charging generator of FIG. 1, wherein FIG. 7(A) illustrates one example of the time series change of the states of the speed, acceleration and deceleration of the vehicle, FIG. 7(B) illustrates the change of the output voltage when the voltage control unit 15 controls the output voltage to an appropriate control voltage in accordance with the states of the speed, acceleration and deceleration of the vehicle illustrated in FIG. 7(A), and FIG. 7(C) illustrates the change of the generated output current when the output voltage is controlled to the control voltages of FIG. 7(B). Here, note that reference characters a through l at respective points in FIGS. 7(A) through 7(C) each represent the same points of timing.

In FIG. 7(A), the vehicle is in a standstill state with the engine being in an idle state from point a to point b, and the vehicle is gradually accelerating from the standstill state from point b to point c, and is traveling at a constant speed from point c to point d.

In addition, in FIG. 7(B), the output voltage is controlled to the normal control voltage Vn from point a to point d.

Also, in FIG. 7(C), the output current becomes constant from point a to point d.

Further, in FIG. 7(A), the vehicle is in a rapid acceleration state from point d to point e, is traveling at a constant high-speed from point e to point j, is in a deceleration state from point j to point k, and again returns to traveling at a constant speed from point k to point 1.

Moreover, in FIG. 7(B), the start of acceleration of the vehicle is detected at point d, and the reverse excitation of the field current is performed so as to control the output voltage to the load-interruption control voltage Vlow. Thereafter, at point f that is after a predetermined time from the time point e at which the acceleration is terminated, the output voltage is controlled to rise gradually from the load-interruption control voltage Vlow to the normal control voltage Vn. The output voltage is again controlled to a constant value, i.e., the normal control voltage Vn, from point h to point j. Subsequently, when it is detected that the vehicle started decelerating at point j, the output voltage is controlled to rise to the regeneration control voltage Vhigh. After the deceleration is terminated, the output voltage is again returned to the normal control voltage Vn from point k to point 1.

Also, in FIG. 7(C), the output current rapidly decreases from the normal control voltage Vn to the load-interruption control voltage Vlow at point d, and it has already been interrupted at point e. Then, the output current is gradually output from time point g at which the output voltage of FIG. 7(B) is restored to the battery voltage Vb. Then, the output current becomes constant from point h to point j. At point j, the output voltage of FIG. 7(B) is increased to the regeneration control voltage Vhigh, so the output current accordingly increases, too. Thereafter, from time point k at which the deceleration is terminated, the output voltage is again returned to the normal control voltage Vn, and the output current is also held at a constant value.

Here, note that when the output voltage is returned from the load-interruption control voltage Vlow to the normal control voltage Vn, it is gradually shifted with the provision of the predetermined time. The predetermined time is automatically selected, based on the vehicle speed, the engine speed, the shift position of the transmission, and the magnitude of the electrical load, from a map in which appropriate values have beforehand been set, or it can be set by calculation.

As described above, according to the first embodiment of the present invention, the output voltage of the armature winding 21 is controlled to a control voltage that inhibits an output current from being output from the armature winding 21 without generating an overvoltage regardless of the magnetizing forces of the permanent magnets 22a, 22b with respect to the armature core 20 and the residual magnetic flux immediately after the field current has been returned to zero from the maximum field magnetomotive force due to the field current. As a result, the following advantageous effects can be achieved. That is, the acceleration performance of the vehicle can be improved and the fuel economy or mileage thereof can also be improved in a total point of view. Moreover, the generation of overvoltage can be suppressed, so the permanent magnets 22a, 22b having large magnetizing forces can be installed, thus making it possible to improve the power generation characteristic of the charging generator to a substantial extent.

In addition, the power generation under normal operation is carried out to output the normal control voltage Vn, and when the acceleration performance of the vehicle is to be improved for example, the output voltage of the armature winding 21 is controlled to switch into the load-interruption control voltage Vlow that inhibits an output current from being output from the armature winding 21, by detecting the start point of acceleration. As a consequence, the acceleration performance of the vehicle can be improved, and the fuel mileage thereof can be totally improved.

Moreover, since the start of acceleration of the vehicle is detected based on at least either one of the amount, speed and acceleration of depression of the accelerator pedal, the driver's intention can be quickly determined, thus making it possible to perform control of good response without providing a uncomfortable sensation to the driver.

Further, during the regenerative charging of the battery 26, the control voltage is controlled to the regeneration control voltage Vhigh that is higher than the normal control voltage Vn, so that the battery can be regeneratively charged in an efficient manner.

Furthermore, since the start point of deceleration of the vehicle is determined based on at least either one of the amount and speed of step-off or release of the accelerator pedal and the amount of depression of the brake pedal, the driver's intention can be accurately and quickly determined, thus making it possible to perform optimal control without providing a uncomfortable sensation to the driver.

In addition, since the control voltage is corrected to a proper value based on the battery temperature, the service life of the battery 26 can be improved.

Moreover, it is possible to suppress the generation of overvoltage within the range of the rotational speed of the charging generator corresponding to the maximum rotational speed of the engine.

Further, the reverse-excitation current is set based on the output voltage and the rotational speed of the rotor 8 immediately after the field magnetomotive force due to the field current has been returned from the maximum field magnetomotive force to zero, in accordance with the combination of the magnetizing forces of the armature winding 21, the field winding 16 and the permanent magnets 22a, 22b. As a result, when the output voltage can be swiftly shifted to a target control voltage, thus making it possible to perform quick and appropriate control upon acceleration of the vehicle.

Furthermore, when the output voltage is switched from the load-interruption control voltage Vlow to the normal control voltage Vn, it is controlled to make a gradual shift, so that a large load is not suddenly applied to the engine, thereby preventing passengers in the vehicle from being caused to feel a deceleration shock.

Additionally, the time for the gradual shift can be adjusted to an appropriate value in accordance with the vehicle speed, the engine speed, the shift position of the transmission, and the magnitude of the electrical load. Accordingly, the shock due to the switching of the control voltage can be further reduced.

Embodiment 2.

A generator motor according to a second embodiment of the present invention is used by switching between the case when it functions as an electric motor for engine starting and for assist driving, and the case when it functions as a charging generator.

Here, note that symbols in FIGS. 8 and 9 to be described below in this second embodiment are the same as those in FIGS. 1 through 3 in the first embodiment, and have similar functions.

Figure 8:
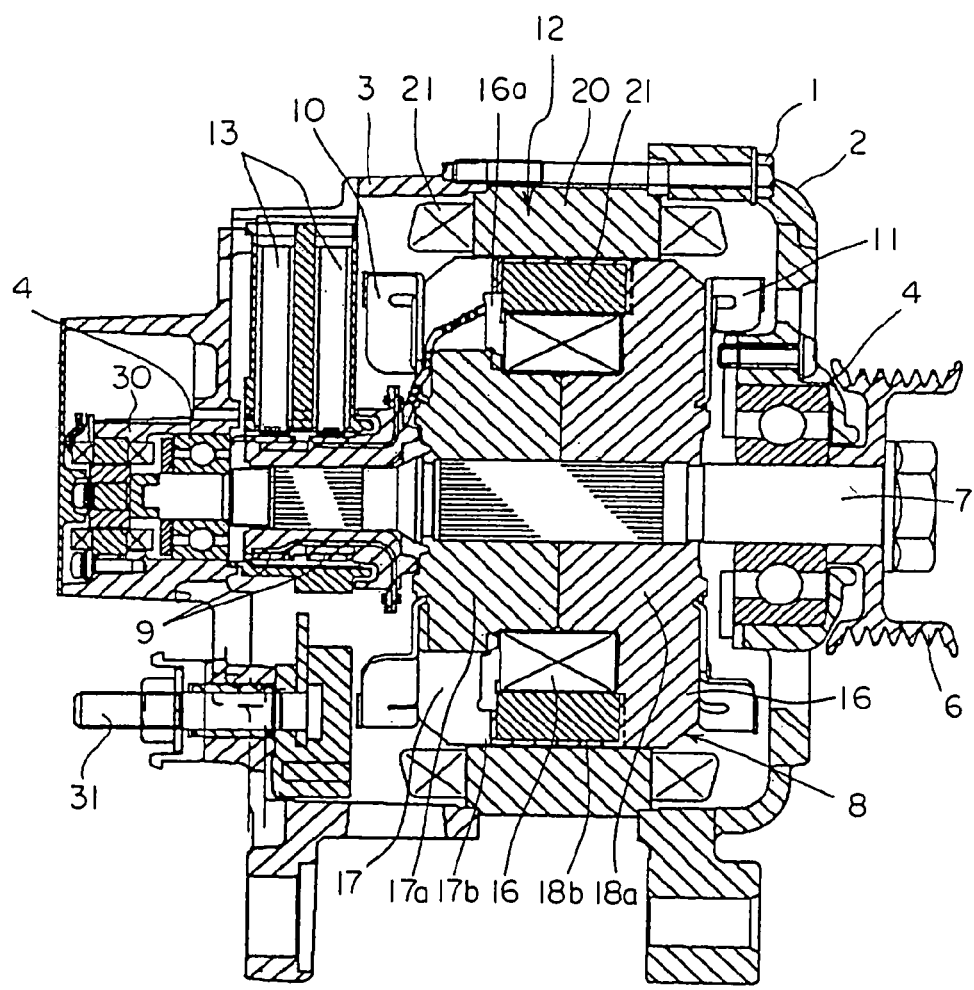
FIG. 8 is a cross sectional view showing the construction of a generator motor according to a second embodiment of the present invention.

FIG. 8 is a cross sectional view that shows the construction of the generator motor according to the second embodiment of the present invention. In FIG. 8, the generator motor, which is an example of a rotating electrical machine, is further provided, as particular constructional elements in comparison with the charging generator of the first embodiment, with a rotational position detector 30 that detects the rotational position of the rotor 8, and a three-phase terminal 31 connected to armature winding 21.

Figure 9:
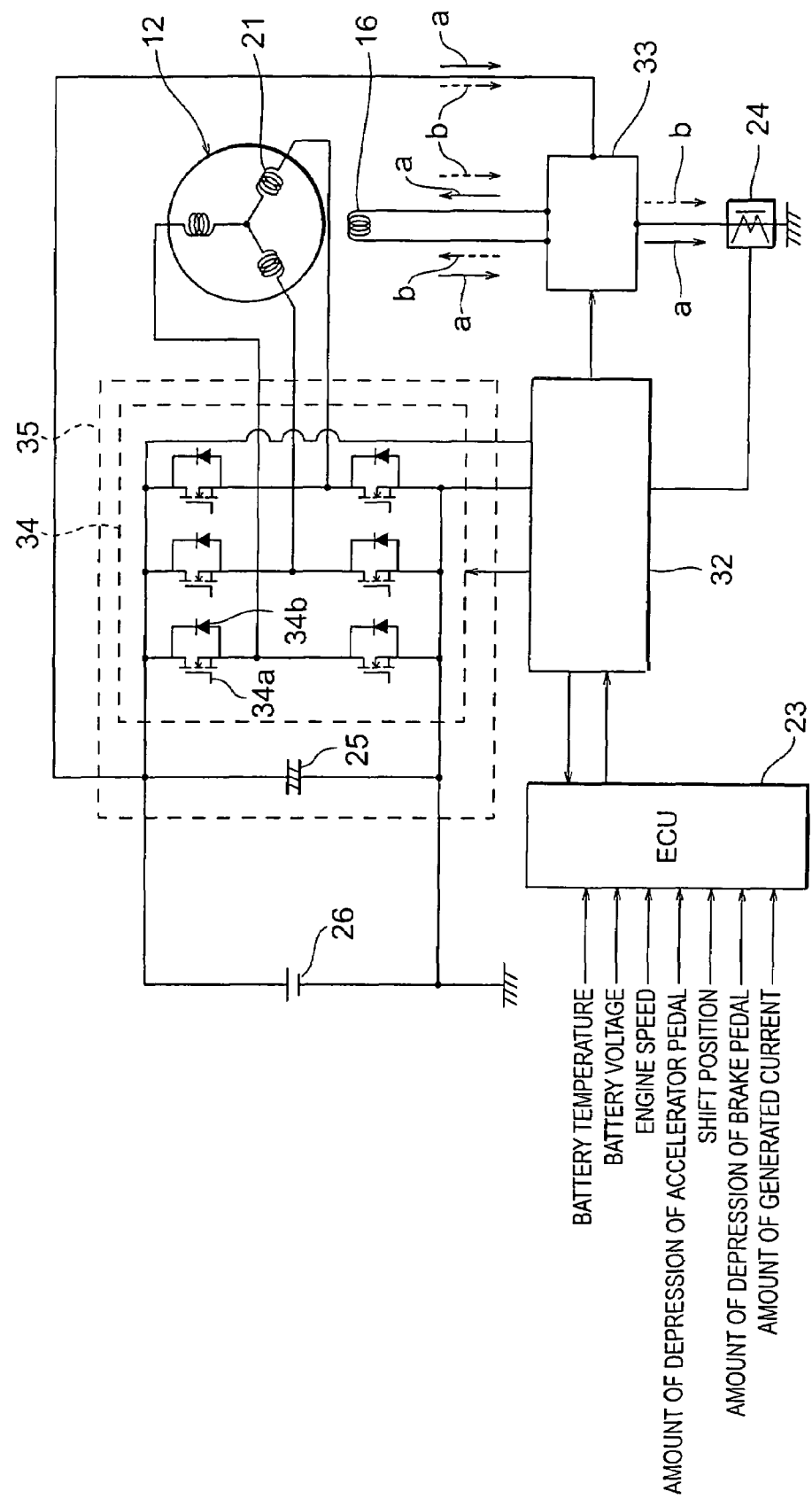
FIG. 9 is a circuit diagram showing a system including the essential portions of the generator motor of FIG. 8.

FIG. 9 is a circuit diagram that shows a system including the essential portions of the generator motor illustrated in FIG. 8.

In FIG. 9, this system includes a voltage control section in the form of a control device 32 for controlling the output voltage of the armature winding 21, an ECU (Engine Control Unit) 23 that inputs necessary information to the control device 32, a field current control device 33 that controls field current in accordance with a command or instruction from the control device 32, a field current detector 24 that outputs a voltage signal of a voltage corresponding to the value of the field current output from the field current control device 33, an inverter unit 35 having an inverter module 34 for commutating the output current of the armature winding 21, and a battery 26 charged by the voltage supplied through the inverter unit 35.

The control device 32 serves to adjust the magnitude and the direction of flow of the field current flowing through the field winding 16 by controlling the field current control device 33 in an appropriate manner.

The inverter module 34 is constructed of three sets of two serially connected pairs of parallelly coupled switching element 34a and diode 34b, which are arranged in parallel to one another. The three armature winding 21 have their one ends connected with one another to form a Y connection (star connection), and their other ends connected to corresponding midpoints (connection points) of the three pairs of serially coupled switching elements 34a, 34a through ac wiring, respectively.

The switching operation of each switching element 34a in the inverter module 34 is controlled by the control device 32.

Now, reference will be made to the operation of the generator motor as constructed above according to the second embodiment of the present invention. The generator motor has both the function of a charging generator and that of an electric motor, and it is used for the idling stop operation of a hybrid vehicle, etc. Here, the operation of the generator motor will be described with reference to the idling stop operation.

First of all, when the condition to start an idling stop operation holds, an unillustrated engine is stopped, and when the condition to restart the engine is satisfied, dc power is supplied from the battery 26 to the inverter unit 35. At that time, the control device 32 controls the individual switching elements 34a of the inverter module 34 to turn them on and off, so that dc power is converted into three-phase ac electric power, which is then supplied to the armature winding 21 of the armature 12 through ac wiring.

As a result, a rotating field is generated around the field winding 16 of the rotor 8 to which field current is supplied by the field current control device 33, whereby the rotor 8 is driven to rotate. The rotation power of the rotor 8 is transmitted from the pulley 6 (see FIG. 1) to the engine through an unillustrated power transmission mechanism, thereby starting to rotate the engine.

When the engine is started to rotate, the rotation power of the engine is transmitted in the opposite order to the rotor 8 through the power transmission mechanism, whereby the rotor 8 is driven to rotate, thus inducing a three-phase ac voltage in the armature winding 21.

At that time, the control device 32 controls the respective switching elements 34a to turn them on and off, so that the three-phase ac electric power induced in the armature winding 21 is converted into dc power, thereby charging the battery 26.

The subsequent control operation, function and advantageous effects of the generator motor as a charging generator are similar to those described with reference to the first embodiment.

Figure 10:
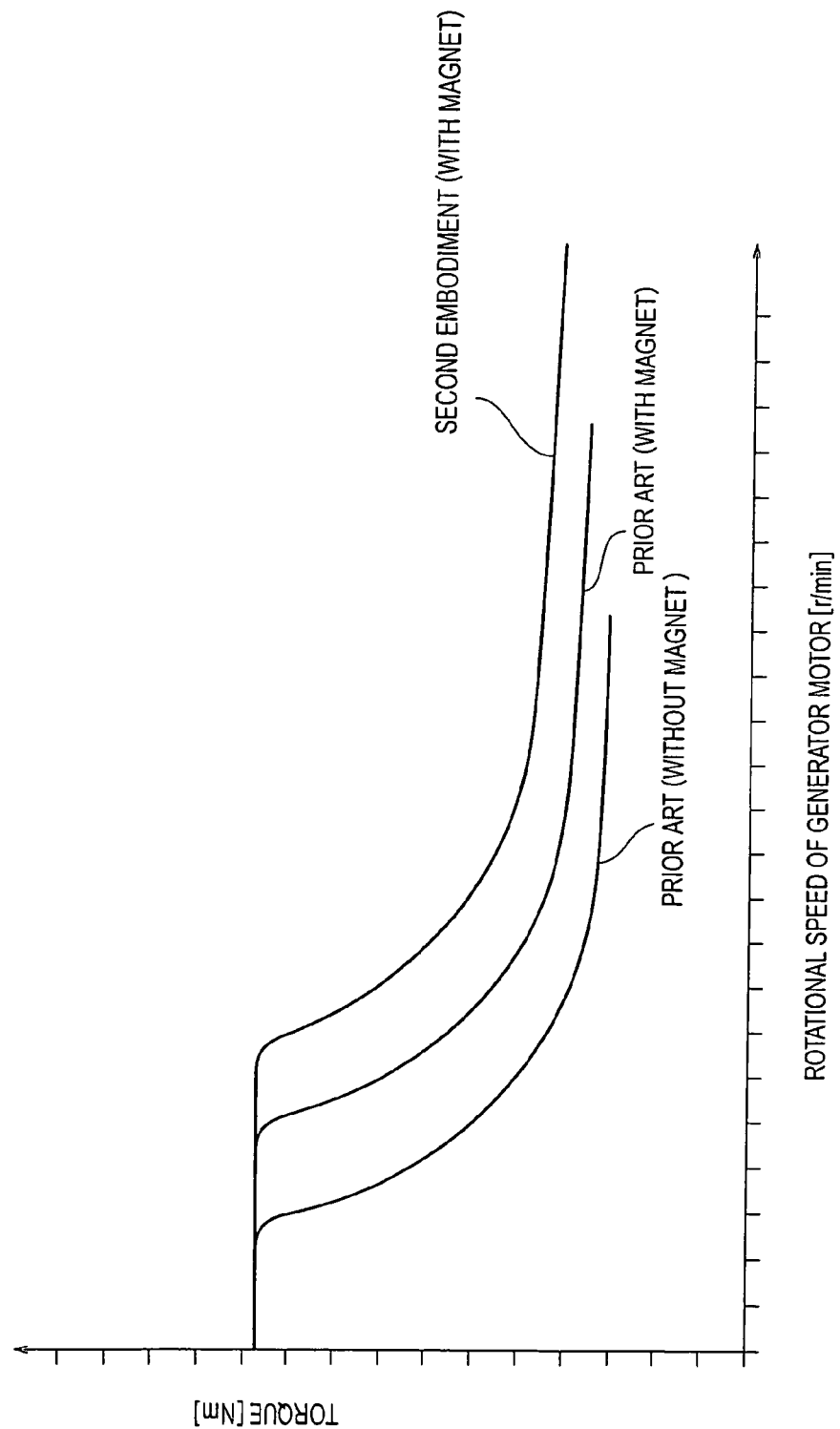
FIG. 10 is a characteristic view showing the torque characteristics of the generator motor according to the second embodiment of the present invention and a prior art generator motor.

FIG. 10 is a characteristic view that illustrates the power generation output characteristic of the generator motor of the second embodiment of the present invention and that of a prior art generator motor.

In FIG. 10, torque characteristic curves illustrated therein of the respective generator motors represent the "prior art (without a magnet)", the "prior art (with magnets)", and the "second embodiment (with magnets)" having magnets of increased magnetomotive forces. For these generator motors, the specifications of the armature windings were adjusted in such a manner that base torque (the highest torque at low rotational speed) become the same for all of them.

From FIG. 10, it is found that the "second embodiment with magnets" can not only obtain a larger torque at the same rotational speed, and but also generate torque until a higher rotational speed, in comparison with the prior art generator motor with or without magnets.

As described above, according to the generator motor of the second embodiment of the present invention, there can be added not only the function to start the engine but also the function to assist the torque of the engine so as to smoothly move the vehicle immediately after engine starting, and the function to improve the acceleration response of the vehicle.

Although in the above-mentioned respective embodiments, the armature winding 21 is constructed to form a three-phase Y connection, it can also be formed to provide a three-phase delta connection.

Further, although in the above-mentioned respective embodiments, the armature winding 21 is of a three-phase construction, it is not limited to such a three-phase construction, but may be a multi-phase winding of more than three phases.

While the invention has been described in terms of preferred embodiments, those skilled in the art will recognize that the invention can be practiced with modifications within the spirit and scope of the appended claims.

What is claimed is:

1. A rotating electrical machine for a vehicle comprising:
   an armature having an armature core and an armature winding wound around said armature core for generating an output voltage to charge a battery;
   a rotor having a rotor core with a field winding wound therearound, and permanent magnets for supplying magnetic flux to said armature core; and
   a voltage control section that adjust said output voltage of said armature by controlling said field current based on the value of an output voltage of said armature winding and the value and the direction of flow of said field current flowing through said field winding;
   wherein when said rotor rotates, said voltage control section inhibits an output current from being output from said armature winding to said battery by controlling said output voltage of said armature winding to one of a plurality of control voltages that are set equal to or lower than an overvoltage of said battery.

2. The rotating electrical machine for a vehicle as set forth in claim 1, wherein said voltage control section includes:
   a voltage detection section that detects an output voltage of said armature winding;
   a field current detection section that detects the value and direction of said field current flowing through said field winding;
   a field current instruction calculation section that calculates the value and direction of a field current to be supplied to said field winding based on the output voltage of said armature winding detected by said voltage detection section and the value and direction of said field current detected by said field current detection section; and a field current control section that controls said current flowing through said field winding based on the result of calculation of said field current instruction calculation section.

3. The rotating electrical machine for a vehicle as set forth in claim 1, wherein said plurality of control voltages include, at least, a load-interruption control voltage Vlow to inhibit an output current from being output from said armature winding to said battery and a normal control voltage Vn to perform normal power generation, said load-interruption control voltage Vlow and the normal control voltage Vn being set as follows:

$Vn \geq Vb > Vlow$ where Vb represents the voltage of said battery; and said output voltage of said armature winding is controlled to switch into said load-interruption control voltage Vlow when a load on an engine with which said rotor is connected is reduced.

4. The rotating electrical machine for a vehicle as set forth in claim 3, wherein said load on said engine is reduced when said vehicle with said engine installed thereon starts accelerating.

5. The rotating electrical machine for a vehicle as set forth in claim 4, wherein the start of acceleration of said vehicle is detected based on at least either one of an amount, speed and acceleration of depression of an accelerator pedal.

6. The rotating electrical machine for a vehicle as set forth in claim 3, wherein said plurality of control voltages further includes a regeneration control voltage Vhigh to regenerate said battery, said regeneration control voltage Vhigh being set as follows:

$Vhigh > Vn \geq Vb > Vlow$.

7. The rotating electrical machine for a vehicle as set forth in claim 6, wherein said voltage control section controls to switch said output voltage of said armature winding into said regeneration control voltage Vhigh when said vehicle starts decelerating with the charged state of said battery being below a predetermined level.

8. The rotating electrical machine for a vehicle as set forth in claim 7, wherein the start point of deceleration of said vehicle is detected based on at least either one of the speed and acceleration of release of an accelerator pedal and an amount of depression of a brake pedal.

9. The rotating electrical machine for a vehicle as set forth in claim 6, wherein said control voltages are corrected based on the temperature of said battery.

10. The rotating electrical machine for a vehicle as set forth in claim 1, wherein said rotor rotates at a rotational speed that is equal to or lower than a rotational speed of said rotor corresponding to a maximum rotational speed of an engine with which said rotor is connected.

11. The rotating electrical machine for a vehicle as set forth in claim 1, wherein said voltage control section decreases said field current to zero from a normal supply direction, and when said output voltage of said armature winding exceeds said control voltage, said voltage control section controls said output voltage of said armature winding to said control voltage by reversely exciting said field winding to supply a reverse-excitation current thereto.

12. The rotating electrical machine for a vehicle as set forth in claim 11, wherein said reverse-excitation current is set based on said output voltage of said armature winding and the rotational speed of said rotor immediately after a field magnetomotive force due to said field current has been returned from a maximum field magnetomotive force to zero, in accordance with a combination of magnetizing forces of said armature winding, said field winding and said permanent magnets.

13. The rotating electrical machine for a vehicle as set forth in claim 3, wherein said output voltage of said armature winding is controlled to make a gradual shift when returned from said load-interruption control voltage Vlow to said normal control voltage Vn.

14. The rotating electrical machine for a vehicle as set forth in claim 13, wherein a set time for the gradual shift is set based on at least either one of the speed of said vehicle, the rotational speed of said engine, the shift position of a transmission, and the magnitude of an electric load.

15. The rotating electrical machine for a vehicle as set forth in claim 1, wherein said rotor core has magnetic pole portions of a claw pole type.

16. The rotating electrical machine for a vehicle as set forth in claim 15, wherein said permanent magnets are disposed at opposite sides of said magnetic pole portions.

17. The rotating electrical machine for a vehicle as set forth in claim 1, wherein said rotating electrical machine has functions of both a charging generator and an electric motor.

* * * * *